April 27, 1965 R. J. RICKERT ETAL 3,180,801
HEAVY WATER MODERATED ORGANIC COOLED NUCLEAR FISSION REACTOR
Filed Sept. 26, 1963 4 Sheets-Sheet 1

INVENTORS
ROYCE J. RICKERT
WILLIAM S. FLINN
JOHN F. ROHLIN
JOHN J. ROTH
BY

April 27, 1965          R. J. RICKERT ETAL          3,180,801
HEAVY WATER MODERATED ORGANIC COOLED NUCLEAR FISSION REACTOR
Filed Sept. 26, 1963                              4 Sheets-Sheet 2

INVENTORS
ROYCE J. RICKERT
WILLIAM S. FLINN
JOHN F. ROHLIN
JOHN J. ROTH
BY

April 27, 1965 R. J. RICKERT ETAL 3,180,801
HEAVY WATER MODERATED ORGANIC COOLED NUCLEAR FISSION REACTOR
Filed Sept. 26, 1963 4 Sheets-Sheet 4

INVENTORS
ROYCE J. RICKERT
WILLIAM S. FLINN
JOHN F. ROHLIN
JOHN J. ROTH
BY

United States Patent Office 3,180,801
Patented Apr. 27, 1965

3,180,801
HEAVY WATER MODERATED ORGANIC
COOLED NUCLEAR FISSION REACTOR
Royce J. Rickert and William S. Flinn, Bloomfield, John
F. Rohlin, Wapping, and John J. Roth, Granby, Conn.,
assignors to the United States of America as represented
by the United States Atomic Energy Commission
Filed Sept. 26, 1963, Ser. No. 311,922
4 Claims. (Cl. 176—51)

The present invention relates to a heavy water moderated, organic liquid cooled nuclear fission reactor having a reduced reactivity requirement.

During recent years considerable effort has been devoted to the development of new reactor concepts which will lead to power sources at reduced costs and will compete successfully with power plants utilizing fossil fuels. While considerable progress has been made in this direction, nuclear power has yet to compete successfully with alternate types of power generators except in special locations or under unique conditions, as for example, at remote locations where fuel delivery costs are excessive.

In order to make further improvements in the efficiencies of nuclear reactors, considerable effort has been expended to seek out materials which are most effective when utilized in a reactor and to obtain a reactor concept which uses these materials in the most efficient manner possible. For example, one of the best moderator materials useful in a thermal reactor is heavy water ($D_2O$) which has a smaller absorption cross-section for neutrons than almost any other material. Being a liquid, in addition, it can be readily held and circulated. However, due to its high vapor pressure, it has to be used at a relatively low pressure to avoid expensive high pressure equipment. Moreover, heavy water is very expensive so that the nuclear reactor should be designed to require a very small inventory of this material.

One way of reducing the amount of $D_2O$ required, is to limit the function of this liquid to moderator only and provide another liquid having a low vapor pressure as coolant. While a wide variety of coolants meeting this requirement are available for use in a nuclear reactor, there are relatively few having suitable nuclear properties which will function at adequate heat transfer levels under relatively low pressures and at the same time are without undesirable handling problems. At higher pressures it is possible to effect heat transfer more efficiently but the gains made thereby are offset by the higher initial and maintenance costs of high pressure equipment throughout the power plant. Liquid metal coolants, which can be used at a low pressure, have the drawback that they impose a variety of difficult problems which can be solved only with the use of elaborate expensive capital equipment and overcoming complex operating problems. One material, however, which has generated considerable interest in the field for use as a coolant under relatively low pressure is that of organic liquid, as for example, terphenyl.

In addition to separating the cooling and moderating functions in the reactor, another way of reducing the size of heavy water inventory would be to reduce the reactivity losses within the reactor. To illustrate the possible savings, a 40% increase in the cost of heavy water inventory is required to provide an additional one percent in reactivity of a nuclear reactor of the size and type to be considered further below. Thus, in order to provide a nuclear reactor which makes the most efficient use of heavy water, it is necessary to provide a reactor design which eliminates reactivity losses to an extent heretofore never accomplished in nuclear reactors of the size required for commercial production of power.

Another feature which would be highly desirable in a practical and efficient reactor would be the capability of using either natural or slightly enriched uranium fuel. Flexibility of this type makes it possible to step up power output without expensive reconstruction and to take advantage of favorable sources of supply and cost advantages found in one type of the fuel.

The present invention offers a reactor concept which makes it possible for the first time to utilize heavy water in the most efficient manner ever obtained in a power reactor whereby further substantial increases in efficiency are made to produce power at a cost which will be more competitive with conventional power sources. In addition the invention permits the use of fuel which is either natural uranium or slightly enriched without making changes in the reactor construction.

It is a well known consideration in nuclear reactor design to incorporate sufficient excess reactivity to compensate for certain expected losses, changes in reactivity over the life of the reactor, and inequality of neutron fluxes throughout the core in order to insure that there will always be, during the design life of the reactor, sufficient reactivity to maintain the desired levels of operation. The nature of the various reactivity losses are usually grouped into the following categories:

(1) Parasitic neutron capture in cladding, structural metal, the coolant;
(2) Neutrons lost to control absorbers; and
(3) Neutrons lost through increased leakage caused by flattening of the gross power distribution in the core.

The neutron losses in the first group are minimized by careful thermal-hydraulic and mechanical design which yields the lowest power cost consistent with the nuclear requirements. Minimizing of the neutron losses in the second and third groups, however, is a more difficult problem which has received considerable attention by workers in the field for a long time.

In order to increase the heat output capability of a reactor, it is common practice to flatten the radial power distribution in the core by differential loading of the fissile material in the radial direction which flattens the neutron flux in the central region of the core. This practice causes a loss in reactivity because it increases the probability for neutron leakage. In addition, burnup of stationary fuel in the higher flux region in the center of the core can produce power flattening with the attendant loss in reactivity due to increased leakage. In a heavy water reactor designed to operate on natural uranium fuel, any reactivity loss can only be compensated, to obtain a critical system, by adding $D_2O$ or by reducing the design life, i.e., burnup, of the fuel. Both of these methods reflect heavily on the economies of the plant.

By the present invention, important reductions in neutron losses arising from the use of control absorbers and neutron flux gradients throughout the core are accomplished to an extent not previously considered possible in a power nuclear reactor utilizing a low pressure coolant such as an organic liquid and a moderator of heavy water.

The concept embodied in this invention is that of achieving a high neutron economy design without prejudicing the heat output capability of the core. A bi-axial refueling procedure yields a permanent radial power distribution which is high in the central fuel channels and lower in the outer regions of the core. The use of two-pass coolant flow with the colder inlet flow through the central region and the hotter, second-pass coolant in the outer region balances the limiting temperature conditions to permit the heat to be extracted from a fewer number of channels.

Briefly described, the inventive reactor includes a unique arrangement in which no excess reactivity is provided which has to be controlled during steady-state operation.

The design is such that the fuel can and is moved during reactor operation to insure that the radial and axial gross flux and power distributions are always the same as those of a freshly loaded core. Thus, no reactivity is lost due to flattening of the central neutron flux. Another unusual feature of this reactor is a complete distribution of fuel at all burnups in each flow channel to insure that the power output of each channel always remains constant. Other features contributing to the final result appear below.

It is thus a first object of this invention to provide a nuclear reactor in which neutron losses are substantially reduced.

Another object is an organic liquid cooled, $D_2O$ moderated nuclear reactor with reduced neutron losses.

Still another object is a nuclear reactor with a core having provision to move, remove and replace fuel during normal operation to maintain a reactor without excess reactivity during its life of operation.

Other objects and advantages of this invention will hereinafter become obvious from the following description of a preferred embodiment of this invention taken with the accompanying drawings in which.

Figure 1:
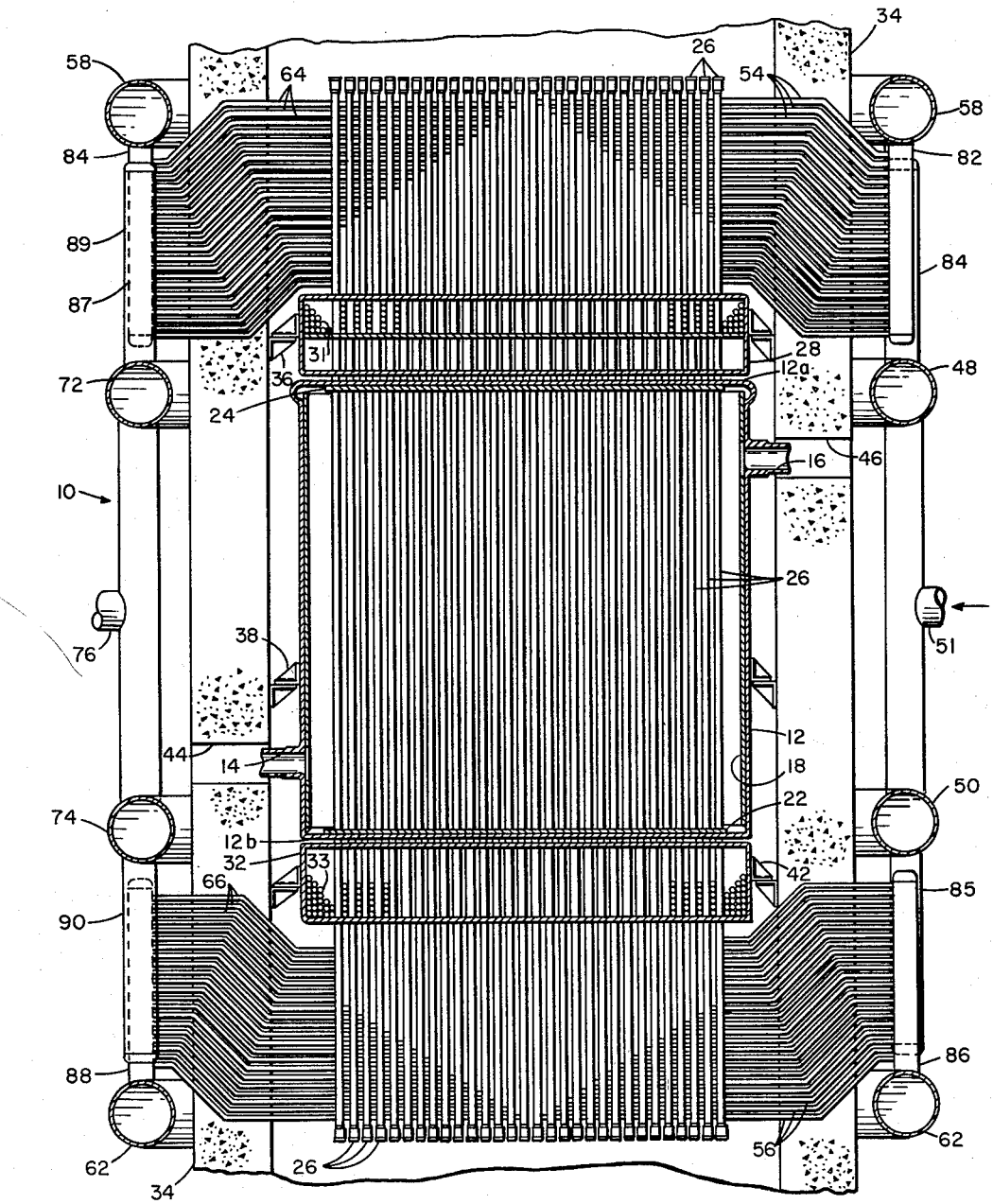
FIG. 1 is an elevation view, partially schematized to show a single row of pressure tubes, and in section, of a reactor embodying the principles of this invention.
Figure 2:
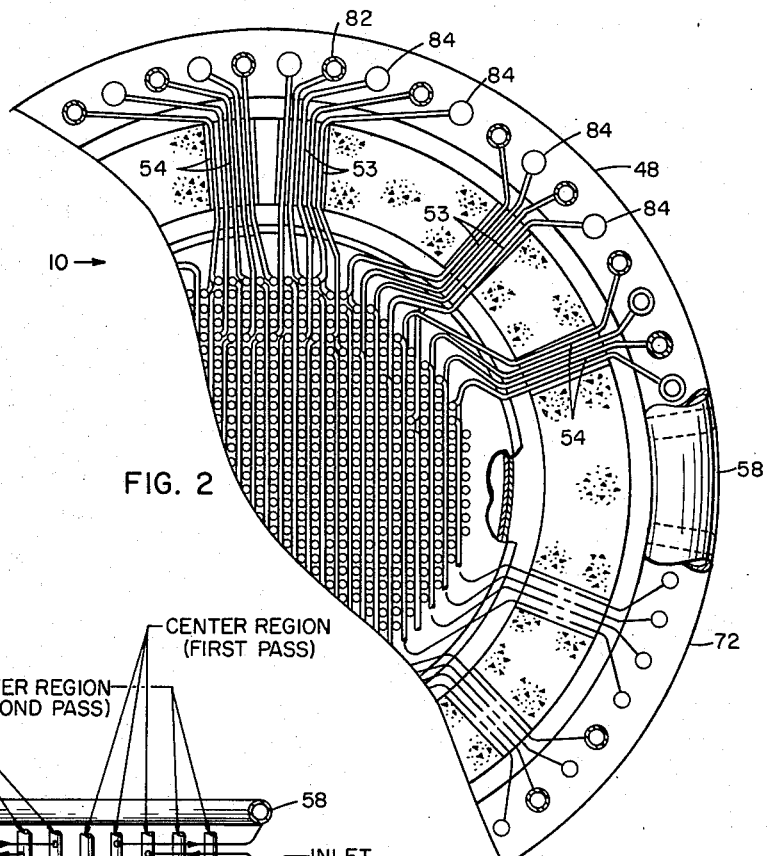
FIG. 2 is a plan view of the reactor in FIG. 1.

Referring to FIGS. 1 and 2, nuclear reactor 10 comprises a sealed, cylindrical moderator tank 12 having a lower inlet nozzle 14 and an upper outlet nozzle 16, as well as upper and lower walls 12a and 12b, respectively. Lining and spaced from the walls of tank 12 if desired are thermal shields 18, 22, and 24. Extending completely through moderator tank 12 are a plurality of spaced, vertical coolant tubes 26, which as will be seen later, contain the fissionable fuel of reactor 10 and through which the coolant flows to withdraw the heat of fission. The moderator liquid contained within tank 12 flows around tubes 26 which are completely sealed except for connecting headers and removable end caps which will be described later.

Above and below moderator tank 12 are a pair of upper and lower cylindrical shield tanks 28 and 32, respectively, filled partially with suitable radiation shielding material such as iron shot 31 and 33. Coolant tubes 26 pass completely through shield tanks 28 and 32.

The assembly of moderator tank 12, shield tanks 28 and 32, and coolant tubes 26 are supported within and spaced from a concrete wall 34 by two or more bracket assemblies 36 for upper shield tank 28, bracket assemblies 38 for moderator tank 12, and bracket assemblies 42 for lower shield tank 32. Moderator inlet and outlet nozzles 14 and 16 would be connected to conduits (not shown) passing through openings 44 and 46 in concrete wall 34 to permit circulation of the moderator and cooling of the latter externally of reactor 10.

One of the features of this reactor design is a two-pass, bi-directional coolant flow arrangement to minimize the influence of the non-uniform neutron flux intensities across the core in determining the limiting thermal conditions and, thus, to permit a higher average heat output for a fixed number of channels. In this construction, the centrally located coolant tubes receive the first pass of coolant. Return headers are provided to mix the first pass fluid so as to supply a uniform temperature coolant to the second pass coolant tubes. Adjacent tubes are connected to their respective headers at opposite ends so that these tubes always have flow in opposite directions. In this way there is a strong tendency to provide uniform temperatures throughout the core region.

Figure 3:
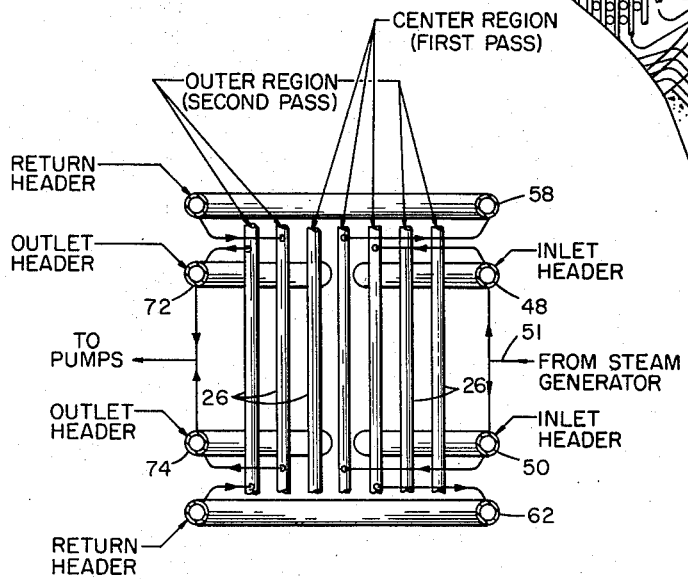
FIG. 3 is a schematic of the core arrangement for this reactor.

Returning to FIGS. 1 and 2 for a more detailed description of this arrangement and to FIG. 3 for a schematic view of the reactor, it is seen that reactor 10 is provided with a pair of semi-annular inlet headers 48 and 50, respectively, partially surrounding the upper and lower regions of moderator tank 12. Coolant is supplied from a common pipe or conduit 51 to the upper region of tank 12 through header 48, sub-headers 84 and jumper tubes 53 to the upper portion of first pass coolant tubes 26. Fresh coolant supplied to the lower region of tank 12 is supplied by way of sub-headers 85 and jumpers (not shown). As pointed out earlier, the coolant tubes 26 in the central region carry the first pass of coolant while those in the outer periphery carry the second pass of the coolant, and as shown schematically in FIG. 3, adjacent tubes 26 receive coolant from upper and lower main headers 48 and 50, respectively, so that flow is in opposite directions in adjoining tubes. The upper and lower downstream ends of first pass tubes 26 are connected by jumper tubes 54 and 56 respectively, to sub-headers 82 and 86 and main headers 58 and 62, respectively, where the coolant from the various channels are mixed to obtain a uniform temperature. Main headers 58 and 62 are connected by way of sub-headers 87 and 88, and jumper tubes 64 and 66, respectively, to opposite ends of adjoining tubes 26 in the outer periphery for the second pass of coolant. Downstream of the second pass of tubes 26 the coolant is led to outlet main headers 72 and 74, by way of sub-headers 89 and 90 where the flows are combined and let out through a common pipe or conduit 76 for use in generating the steam output of the power plant incorporating this reactor.

Another important feature of this nuclear reactor is the arrangement of the fuel within tubes 26 to permit on-stream refueling and a shuffling of fuel during operation of the reactor to maintain a complete distribution of fuel at all burnups within each tube 26 to assure that the radial and axial gross flux and power distributions remain substantially constant, so that no reactivity is lost due to flattening of the central neutron flux.

Figure 4:
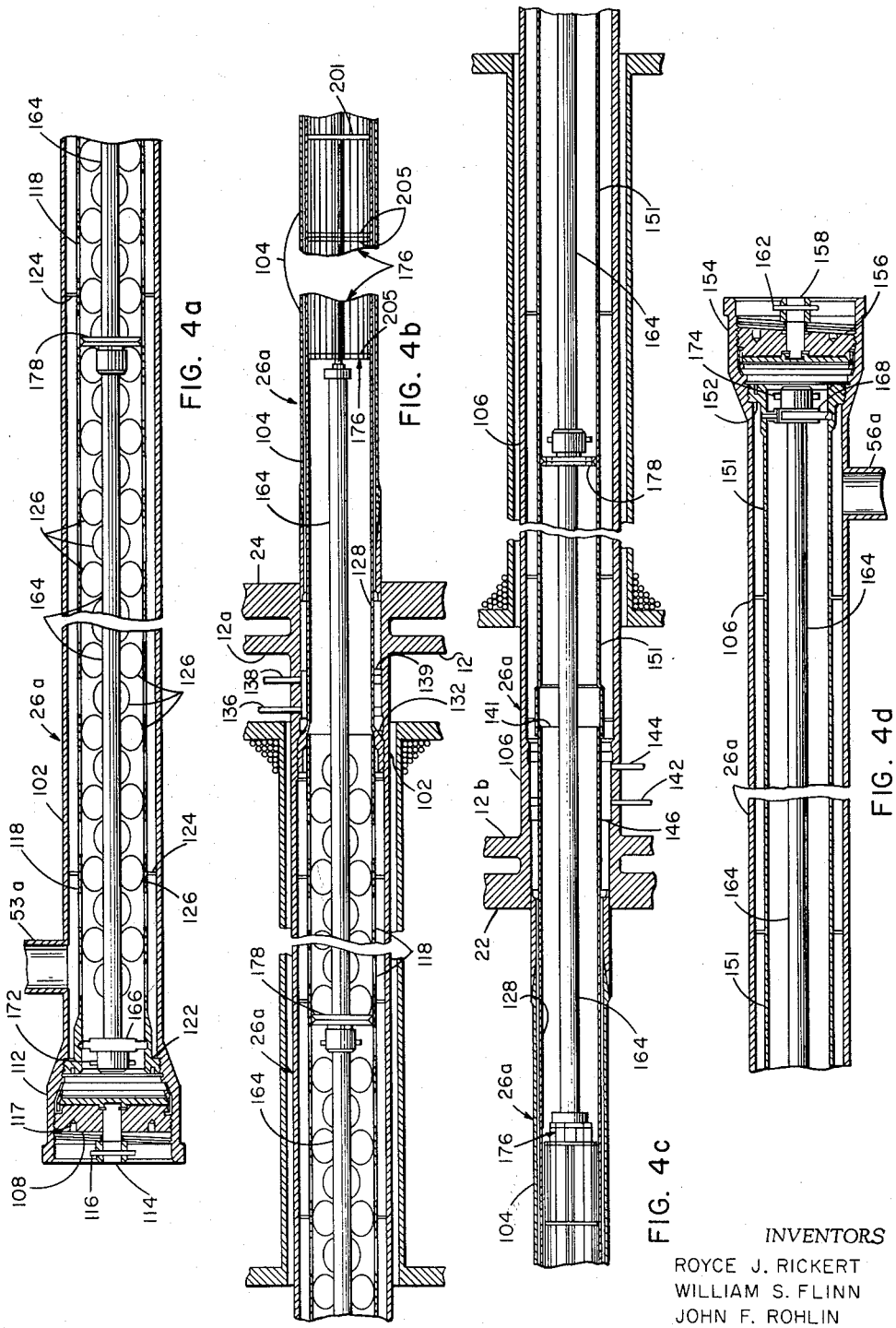
FIGS. 4A, 4B, 4C and 4D show a typical pressure tube construction, partially cut away, extending the length of the reactor shown in FIG. 2.

For the details of a typical coolant tube 26a reference is made to FIGS. 4A, 4B, 4C and 4D which illustrate tube 26a in portions. It will be noted that tube 26a consists of an upper section 102, a central section or calandria tube 104, and a lower section 106. Upper section 102 receives its coolant from a jumper tube 53a and is sealed off at the top with a cap 108 which is threaded into engagement with thimble opening 112 of tube 26a. Lower section 106 has a jumper tube 56a for coolant leaving tube 26a. Seal cap 108 is provided with a shaft 114, pin 116, and holes 117 used in removing cap 108 when desired. Upper section 102 terminates, as seen in FIG. 4B, in top wall 12a and shield 24 of moderator tank 12.

Within tube 26a is suspended an inlet guide tube 118 from a threaded flange 122 spaced from the outer wall of 26a and held in proper spaced relationship by spacer members 124. Guide tube 118 is provided with a number of large holes 126 as illustrated to permit the coolant to flow freely around and through it.

From FIG. 4B it will be seen that at the lower end of guide tube 118 an inner pressure tube 128 is suspended from a flange 132 threaded into upper section 102. Closely spaced from and surrounding inner pressure tube 128, beginning at a point just below the upper wall of moderator tank 12 is a calandria tube 104 attached to top shield 24 by any convenient means, such as by welding, for passage through moderator tank 12. The space between pressure tube 128 and calandria tube 104 is pressurized by an inert gas by way of pipes 136 and 138 and a seal arrangement 139 to prevent leakage of moderator into the coolant, and vice versa. In similar fashion calandria tube 104 terminates in the bottom wall 12b of moderator tank 12 while inner pressure tube 128 has its bottom 141 below moderator tank 12. A pair of pipes 142 and 144 along with seal arrangement 146 help to maintain sealing in this location as above.

Beginning at a point adjacent the bottom 141 of inner pressure tube 128 is the outlet guide tube 151 extending down to a threaded flange 152 in lower thimble 154 of coolant tube 26a. A threaded seal cap 156 with a rod 158 and a pin 162 for engagement provide closing and sealing of coolant tube 26a at the bottom.

Within tube 26a extending between upper and lower seal caps 108 and 156 is located a solid spacer or fuel positioning rod 164 having members 166 and 168 to lock with guide tubes 118 and 151. A pair of pins 172 and 174 facilitate attachment when removed or replaced. Rod 164 supports by contact only several fuel assemblies 176 within moderator tank 12, and has spacer members 178 at various points along the length thereof to insure proper centering of rod 164 at all times. By the arrangement illustrated and just described, it will be seen that fuel assemblies 176 can be pushed out either end of tube 26a by removing end caps 108 and 156 and pulling and pushing rod 164 out.

Figure 5:
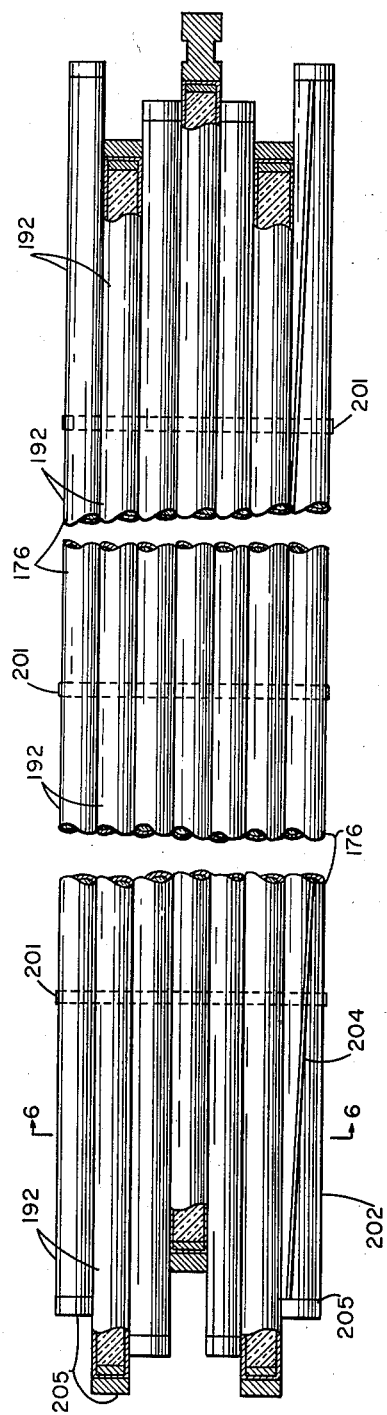
FIG. 5 is a typical fuel element assembly in section to show the staggered ends of the fuel rods.
Figure 6:
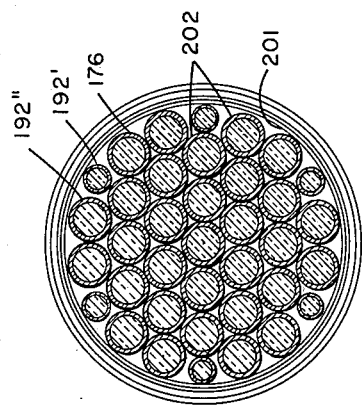
FIG. 6 is a view along 6—6 of FIG. 5.

The details of a typical fuel assembly 176 are shown in FIGS. 5 and 6. Fuel assembly 176 is composed of a cluster of fuel rods 192 which are of two diameters, 192' and 192", which are grouped together in a circular pattern and held together by bands 201. Five of the assemblies 176 are axially grouped within pressure tube 128 as illustrated in FIGS. 4B and 4C. The ends of fuel rods 192 are staggered as shown in FIG. 5 so as not to concentrate the loss of fuel due to end caps in one small region at the end of each fuel assembly. This reduces flux peaking. The outer ring of fuel elements 192, however, are of the same length so that the assemblies grouped together will have equal and balanced bearing surfaces, as illustrated in FIGS. 4B and 4C.

Each fuel rod 192 is composed of $UO_2$ sheathed in a tube 202 on which an integral spiral key 204 has been extruded. The ends of tubes 202 are closed off with end caps 205. Key 204 acts as a spacer between individual fuel rods 192 when assembly 176 is banded together.

It will be noted that the fuel assemblies 176 merely abut each other without positive connection as is also the case with rod 164 and the end fuel asemblies 176. The complete absence of couplings in the core reduces parasitic neutron capture. The fuel positioning rods 164 merely act as spacers for maintaining the proper position of fuel assemblies and also make possible the removal of the latter as will be seen below.

While the arrangement for the control of this reactor has not been described, it is understood that control rods can be inserted into the moderator between the coolant tubes and regulated in a way now well understood in the art. An alternative arrangement for the control of this reactor is the so-called Hy-Ball type in which columns of borated steel balls are inserted in moderator tank 12. By use of hydraulic means the balls are pumped in and out of the moderator region of the reactor. While this type of poison control is listed in the table below, it is understood that either type, neither being a part of this invention, can be utilized.

In the operation of the reactor described, it is seen that refueling takes place without shutting the power plant down. At regular intervals, both ends of a coolant tube 26 are opened by removal of the seal caps. The spacer bar 164 is then used to push fuel assemblies 176 in the direction of coolant flow until one assembly, typically, is removed from the downstream end. A fresh fuel asembly is then inserted into the upstream end of the coolant tube by manipulating spacer rod 164. Hence, it is seen that the hottest coolant is at the end of the channel in contact with the fuel generating the lowest power in the channel to produce more efficient thermal design.

In fact, it will be seen that over the whole life of the reactor, after an initial period of adjustment, each channel will have throughout its length and entire life of service substantially constant fuel composition so that the radial and axial flux and power distribution will not vary in time. Thus, no reactivity is lost due to flattening of the central neutron flux as occurs in reactors of conventional design.

This method of fuel management results in the least reactivity requirement to provide a burnup of 5000 mwd./t. with natural uranium for the reactor described in the table below. Hence, the nuclear advantage of minimum reactivity requirement with this refueling method is obtained without levying a large penalty on the thermal-hydraulic design.

A further advantage of the refueling method is apparent when the case of fuel burnup to 20,000 mwd./t. with enriched fuel is considered. Fuel which is ready to be discharged from the reactor has experienced a large reduction in total fission cross section as compared to freshly loaded fuel. Since each flow channel contains a complete distribution of fuel at all burnups, the power output of the channel always remains constant. Therefore, the thermal design does not have to provide for widely varying power outputs per channel between the natural uranium and the enriched uranium case. As the fuel proceeds down the channel, the increasing burnup eventually reduces the local power generation in the element. Furthermore, the continuous refueling of the reactor without shutdown eliminates the need for downtime found in other reactors and contributes materially to the efficiency of the reactor as a power source.

Parameters of a reactor design for a 500 mwe. size unit (with both natural and slightly enriched fuel) in accordance with this invention, are given in the table.

It is thus seen that there has been provided a nuclear reactor utilizing $D_2O$ moderator more efficiently than believed heretofore to have been possible and which has other advantages including more efficient utilization of fuel and reduced neutron losses.

While only a preferred embodiment has been described, it is understood that the scope of the invention is not to be limited thereby but is to be defined by the appended claims.

*Table*

| General: | |
|---|---|
| Reactor type | $D_2O$ moderate, organic cooled. |
| Steam cycle type | Non-reheat with turbine moisture extraction. |
| Total fission power, including moderator heat loss, mw. | 1,550. |
| Turbine gross electrical output, mwe | 542.3. |
| Station net electrical output, mwe | Enriched, 512.2. Natural, 510.3. |
| Net plant heat rate, B.t.u./kw.-hr | Enriched, 10,330. Natural, 10,370. |
| Net plant efficiency, percent | Enriched, 33.05. Natural, 32.92. |
| Fuel and core: | |
| Type of fuel | $UO_2$. |
| Fuel density, percent of theoretical | 91. |
| Design burnup, mwd./metric ton | Enriched, 20,000. Natural, 5,000. |
| Cladding material | XAP-001. |
| Cladding thickness, in | 0.010 and 0.016. |
| Fuel rod O.D., in | 0.313 and 0.513. |
| Number of fuel rods per bundle | 6 plus 31. |
| Overall length of fuel bundle, in | 40. |
| Number of bundles per pressure tube | 5. |
| Coolant tubes: | |
| Number | 600. |
| Lattice arrangement | Square. |
| Pitch, in | 9¾. |
| Material | Zr-2 and XAP-001. |
| Outside diameter, in | 4½₃₂. |
| Wall thickness, in | Zr-2 0.036 and XAP 0.062. |
| Insulation material | 0.100 in. inert gas annulus. |
| Core length, in | 192. |
| Core equivalent diameter, in | 209. |
| Radial reflector thickness, in | 12. |
| Axial reflector thickness, in | 12. |
| Total $UO_2$ loading, lbs | 246,000. |
| Type of control unit | Hy-ball. |
| Number of control units | 200. |

Table—Continued

| | Enriched | Natural |
|---|---|---|
| Nuclear: | | |
| Reactivity allowances, percent: | | |
|   Cold to hot, moderator to 200° F | −0.26 | −0.26 |
|   coolant to 650° F | +0.85 | +1.1 |
|   Zero to full power (Doppler) | −0.54 | −0.54 |
|   Clean to equilibrium xenon, samarium | −3.2 | −3.3 |
|   Burnup (first core peak to equilibrium) | 0 | −1.7 |
| Maximum excess reactivity, percent $\Delta k/k$ | 4.0 | 5.8 |
| Total reactivity worth of Hy-balls, percent $\Delta k/k$ | 10 | 11 |
| Shutdown margin, percent $\Delta k/k$ | 6 | 5 |
| Coolant temperature coefficient of reactivity, $\Delta k/k/°F$ | $3.5 \times 10^{-5}$ | $4 \times 10^{-5}$ |
| Fuel (Doppler) temperature coefficient of reactivity, $\Delta k/k/°F$ | $-0.6 \times 10^{-5}$ | $-0.6 \times 10^{-5}$ |
| Moderator temperature coefficient of reactivity, $\Delta k/k/°F$ | $-2 \times 10^{-5}$ | $-2 \times 10^{-5}$ |
| Fuel inventory and burnup: | | |
|   Uranium total, metric ton | 98.7 | 98.7 |
|   Initial enrichment, w/o U-235 | 1.25 | 0.7115 |
|   Discharge enrichment, w/o U-235 | 0.05 | 0.30 |
|   Discharge plutonium, gms./kg. U, initial | 6.09 | 3.23 |
|   Design life, mwd./metric ton of U | 20,000 | 5,000 |
| Fuel conversion ratios, by weight: | | |
|   Gross lifetime: | | |
|     Total Pu generated/U-235 lost | 1.40 | 1.24 |
|     Fissionable Pu generated/U-235 lost | 1.23 | 1.06 |
|   Net lifetime, Pu remaining/U-235 lost | 0.51 | 0.79 |
| Lifetime energy production, percent: | | |
|   U-235 fission | 0.49 | 0.64 |
|   U-238 fast fission | 0.01 | 0.01 |
|   Pu fission | 0.50 | 0.35 |
| Thermal: | | |
| Average heat flux, B.t.u./hr. ft.$^2$ | 115,000 | 115,000 |
| Maximum heat flux, B.t.u./hr. ft.$^2$ | 298,400 | 352,500 |
| Flux or heat generation ratios, peak/average: | | |
|   Basic radial | 1.35 | 1.96 |
|   Basic axial | 1.60 | 1.29 |
|   Radial local | 1.05 | 1.07 |
|   Axial local | 1.04 | 1.03 |
| Maximum clad surface temperature, °F | <850 | <850 |
| Maximum $UO_2$ fuel temperature including all hotspot factor, °F | <3,450 | <3,750 |
| Minimum DNB ratio | >4.8 | >4.7 |

| | |
|---|---|
| Primary coolant system: | |
| Coolant material | Santowax OMP, 10% High Boilers. |
| Total coolant flow, lb./hr | 42,900,000. |
| Power to coolant, mw | 1,480. |
| Reactor inlet temperature, °F | 536. |
| Reactor outlet temperature, °F | 760. |
| Temperature rise through reactor, °F | 224. |
| Total system pressure drop | Enriched, 267. Natural, 303. |
| Reactor pressure drop (header to header), p.s.i. | Enriched, 223. Natural, 259. |
| Number of loops | 4. |
| Type of pumps | Centrifugal. |
| Number of pumps per loop | 1. |
| Coolant pressure at pump intake, p.s.i.a. | 80. |
| Pump discharge pressure, p.s.i.a. | Enriched, 347. Natural, 383. |
| Pumping power per pump, kw(e) | Enriched, 3,600. Natural, 4,100. |
| Coolant inventory, lb | 790,000. |
| Makeup, lb./day | 7,200. |
| Blanket gas | Nitrogen. |
| Materials in contact with coolant | Carbon steel, XAP-001, stainless steel. |
| Moderator System: | |
| Medium | $D_2O$. |
| Moderator tank inlet temperature, °F | 130. |
| Moderator tank outlet temperature, °F | 190. |
| Design temperature, °F | 250. |
| Total flow rate, lb./hr | 4,350,000. |
| Number of loops | 1. |
| Number of pumps per loop | 1. |
| Type of pumps | Centrifugal. |
| Pump head at rated flow, p.s.i. | 50. |
| Pumping power per pump, kw | 300. |
| System design pressure, p.s.i.g. | 150. |
| Blanket gas | Helium. |
| Materials in contact with moderator | Stainless steel, zircaloy. |
| Total inventory, lb | 519,000. |
| Makeup, lb./year | 5,000. |
| Cooling arrangement | Non-regenerative. |
| Secondary system: | |
| Medium | $H_2O$. |
| Steam generator inlet temperature, °F | 390. |
| Steam generator outlet temperature, °F | 525. |
| Superheater inlet temperature, °F | 525. |
| Superheater exit temperature, °F | 725. |
| Steam generator pressure, p.s.i.a. | 850. |
| Superheater exit pressure, p.s.i.a. | 825. |
| Flow rate thru steam generator, lb./hr. | 5,121,000. |
| Steam flow to turbine, lb./hr | 5,093,400. |
| HP Turbine inlet temperature, °F | 725. |
| HP Turbine inlet pressure, p.s.i.a. | 800. |
| IH Turbine inlet temperature, °F | 470. |
| IH Turbine inlet pressure, p.s.i.a. | 240. |
| LP Turbine inlet temperature, °F | 290. |
| LP Turbine inlet pressure, p.s.i.a. | 58. |
| Condenser pressure, inches Hg | 1.5. |
| Number of stages of feedwater heating | 5. |
| Type of feed pumps | Centrifugal. |
| Number of pumps | 2. |
| Pumping power per pump, kw | 3,000. |
| Pump head, p.s.i. | 1,030. |

What is claimed is:

1. A nuclear fission reactor comprising a sealed moderator tank, spaced coolant tubes having end assemblies extending completely through said tank, fissionable fuel assemblies within each of said coolant tubes forming the reactive core of said reactor, means for permitting the replacement of fuel at regular intervals during normal operation of said reactor, the latter said means including spacer means for maintaining said assemblies in predetermined axial positions within said coolant tubes, said fuel assemblies in each coolant tube being in axial array and without positive interconnection, said spacer means aligned axially with the fuel assemblies in each coolant tube similarly in surface contact with the end assemblies to permit the selective removal and replacement of fuel assemblies from each fuel coolant tube by withdrawing and pushing said spacer means through each said tube, means for pumping heavy water at relatively low pressure through said moderator tank and around said coolant tubes to moderate the neutrons produced as the result of the fission of said fissionable fuel in said fuel assemblies, and means for circulating through said coolant tubes in contact with said fuel assemblies at a relatively low pressure an inert liquid coolant to remove the heat of fission of said reactor.

2. The nuclear reactor of claim 1 in which means are provided to supply said coolant to each of said coolant tubes adjacent one end thereof and remove same adjacent the opposite end thereof such that flow through adjacent tubes is in opposite directions and in the direction of fuel movement during removal and replacement of fuel assemblies, thereby said fuel assemblies in each said coolant tube being always arranged so that the freshest fuel is at the upstream end of each said coolant tube and each subsequent fuel assembly in the downstream direction is more depleted than its adjacent upstream assembly.

3. The nuclear reactor of claim 2 in which means are provided to circulate said coolant in two complete passes through said tubes, the first pass being through coolant tubes located in the central region of said core and the second pass of said coolant being through the remaining tubes located in the outer region of said core thereby tending to render the temperature through said core more uniform.

4. The nuclear reactor of claim 3 in which a first pair of semi-annular main headers are disposed adjacent and around the upper and lower portions of said moderator tank to receive fresh coolant, means to distribute said coolant in said headers to said coolant tubes, a pair of annular headers adjacent the upper and lower ends of said tubes, means for distributing coolant at the end of the first pass to said annular headers for mixing, means for distributing the mixed coolant into the second pass coolant tubes, and a second pair of semi-annular main headers oppositely facing said first pair of semi-annular headers to receive heated coolant completing the second pass through said reactor, and means for removing the heated coolant for external utilization.

(References on following page)

References Cited by the Examiner

UNITED STATES PATENTS

| | | | |
|---|---|---|---|
| 2,848,404 | 8/58 | Treshow | 176—64 |
| 2,856,337 | 10/58 | Untermyer | 176—30 |
| 2,915,446 | 12/59 | Liljeblad | 176—58 |
| 2,977,297 | 3/61 | Evans et al. | 176—52 |
| 2,982,711 | 5/61 | Rand | 176—31 |
| 3,076,753 | 2/63 | Bell | 176—61 |
| 3,080,308 | 3/63 | Dickinson | 176—61 |
| 3,086,929 | 4/63 | Tunnicliffe | 176—30 |
| 3,093,565 | 6/63 | Blockley et al. | 176—59 |
| 3,108,053 | 10/63 | Vrillon et al. | 176—58 |

FOREIGN PATENTS

| | | |
|---|---|---|
| 1,162,270 | 4/58 | France. |
| 1,254,435 | 1/61 | France. |
| 1,297,266 | 5/62 | France. |
| 1,299,368 | 6/62 | France. |

CARL D. QUARFORTH, *Primary Examiner.*